No. 750,463. PATENTED JAN. 26, 1904.
R. Y. KESSLER.
FERTILIZER AND GRAIN DISTRIBUTER.
APPLICATION FILED OCT. 29, 1903.
NO MODEL.
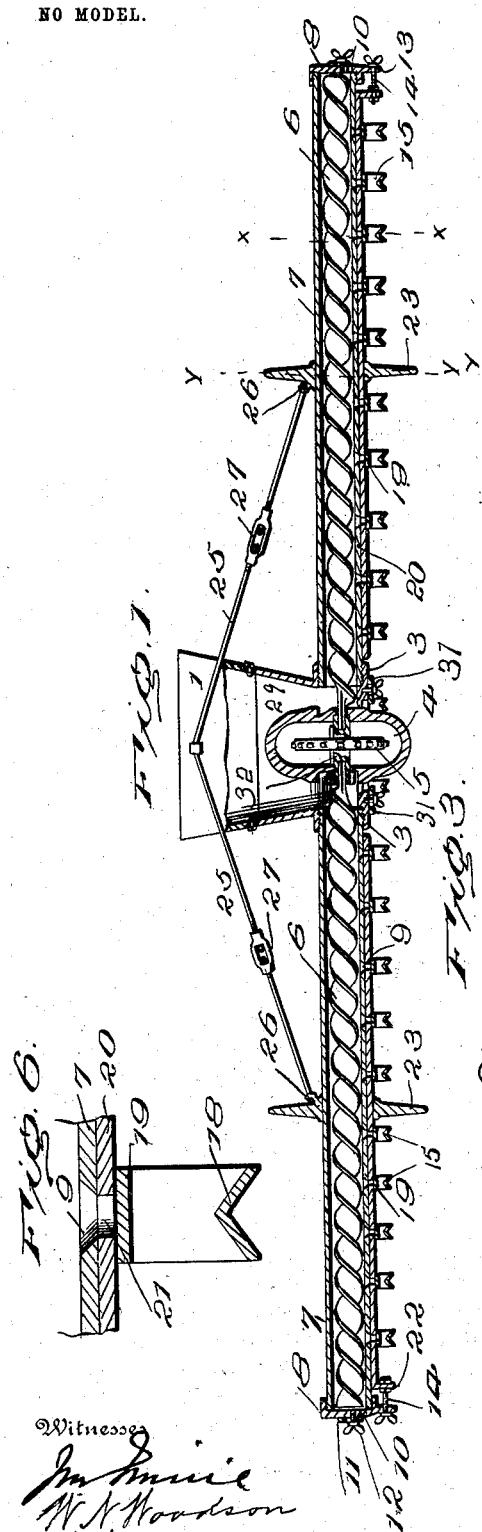

No. 750,463. Patented January 26, 1904.

UNITED STATES PATENT OFFICE.

RICHARD Y. KESSLER, OF PAWNEE, ILLINOIS.

FERTILIZER AND GRAIN DISTRIBUTER.

SPECIFICATION forming part of Letters Patent No. 750,463, dated January 26, 1904.

Application filed October 29, 1903. Serial No. 179,082. (No model.)

*To all whom it may concern:*

Be it known that I, RICHARD Y. KESSLER, a citizen of the United States, residing at Pawnee, in the county of Sangamon and State of Illinois, have invented certain new and useful Improvements in Fertilizer and Grain Distributers, of which the following is a specification.

The primary object of this invention is the provision of a distributer of novel construction for scattering grain broadcast, although it may be used to advantage for spreading fertilizer, such as guano and plaster.

The distributer is adapted to be applied to any type of planter or distributer mechanism and is operated from a moving part of the machine, deriving its initial power from traction of one or more supporting-wheels with the ground.

The mechanism will be described more fully hereinafter and is illustrated in the accompanying drawings; and it consists, essentially, of the novel features, details of construction, and combinations of parts noted more particularly in the appended claims.

In the drawings, which illustrate an embodiment of the invention, Figure 1 is a central longitudinal section of a distributer embodying the invention. Fig. 2 is a transverse section on the line X X of Fig. 1, showing the parts on a larger scale. Fig. 3 is a cross-section on the line Y Y of Fig. 1 on a larger scale. Fig. 4 is an end view of the distributing-tube on the same scale as Figs. 2 and 3, the hopper and braces being omitted. Fig. 5 is a central longitudinal section of the lower portion of the hopper and the adjunctive parts. Fig. 6 is a detail section on the line Z Z of Fig. 2.

Corresponding and like parts are referred to in the following description and indicated in all the views of the drawings by the same reference characters.

The hopper in its preferable construction comprises an upper portion 1, of wood or metal, and a lower portion 2, which is a casting, and is provided at opposite sides with threaded extensions 3 and intermediate of its sides with an opening 4 to receive the sprocket-wheel 5 or like part to which the power is applied for rotating the feed-augers 6, arranged in tubes 7, coupled at their inner ends to the threaded extensions 3 and closed at their outer ends by means of caps 8. The tubes 7 may be of any length and diameter and are provided at intervals in their length with discharge-openings 9, which are upwardly flared to prevent injury to the grain when fed along by the augers 6. Discharge-openings 10 are formed in the lower portion of the caps 8 and are regulated by cut-offs 11, consisting of plates secured in an adjusted position by means of clamp-screws 12, which are threaded into the caps 8 and pass through slots of the plates 11. Each of the caps 8 is provided with a pendent lug 13, in which set-screw 14 is threaded.

A scatterer 15 is provided for each discharge-opening of the tubes 7 and consists of a frame the side bars of which are oppositely curved at their upper ends, as shown at 16, to embrace opposite sides of the tube, to which they are secured by machine-screws 17 or kindred fastenings. The lower or horizontal bar of each frame is oppositely inclined from a medial line, as shown at 18, to direct the grain or fertilizer to the right and to the left. Lugs 19 project inward from the side bars of the frame and support the cut-off 20, by means of which delivery of grain or fertilizer is regulated. The cut-off 20 is slidable beneath the tube and is provided with openings 21, corresponding in number and position with the openings 9 of the tube 7. The outer end of each cut-off is bent downwardly, as shown at 22, and the inner end of the set-screw 14 is connected thereto by a swivel-joint. Hence upon rotating the set-screw in one direction the cut-off 20 is moved to reduce the size of the discharge-openings or to close them entirely, and upon rotating the set-screw in the opposite direction the cut-off is moved so as to increase the effective size of the discharge-openings to their full capacity.

Handpieces 23 are secured to the tubes 7 at any determinate point and are adapted to be grasped when turning the tubes either to screw them into or unscrew them from the threaded extensions 3. The handpieces 23 consist of a bar having its central portion widened and apertured to receive the tubes, clamp-screws 24 serving to connect the handpieces in the required position. Braces 25 are interposed between the handpieces 23 and the upper portion of the hopper and are connected to the handpieces by hooks 26, forming an integral part thereof, said braces being adjustable by means of turnbuckles 27 or analogous means.

The base portion 2 of the hopper is provided with a central portion 28, in which is formed the opening 4 and at each side of which is provided a passage 29, through which the grain or fertilizer travels on its way to the tubes 7. A discharge-opening 30 is formed in the bottom of the hopper adjacent to the central portion 28 and is regulated by a cut-off 31. A shaft 32 is journaled at its ends in bearings formed in the side portions of the part 28, and the sprocket-wheel 5 or analogous part is keyed or otherwise secured to said shaft. The inner ends of the augers 6 are coupled to the shaft 32, so as to rotate therewith, and, as shown, sockets of angular form are formed in the ends of the shaft 32 for reception of stems at the inner ends of the feed-augers 6. Upon removal of the caps 8 the augers 6 may be withdrawn from the tube 7 or placed in position, as required. Inasmuch as the augers make connection with the shaft 32 by means of a slip-joint, said augers may be readily removed with the tubes, when the latter will be disconnected from the hopper, or may be independently removed through the tubes when the caps 8 are displaced.

While the attachment is specially designed for distributing grain, it is obvious that it may be utilized for scattering fertilizer of the nature of guano and like pulverulent material. The mechanism may be mounted upon an implement of any kind and is adapted to be operated by any convenient and suitable source of power connected with the element 5. As the feeders 6 are rotated the grain, fertilizer, or the like is fed from the hopper outward along the tube 7 and is discharged through the openings 9, the amount being regulated by proper adjustment of the cut-offs 20.

Having thus described the invention, what is claimed as new is—

1. In combination, a hopper, a tube projected from the hopper in an approximately horizontal position and provided at intervals in its length with discharge-openings, a cap for closing the outer end of the tube and detachably fitted thereto, a feeder insertible into the tube through the cap-closed opening thereof, actuating means for the feeder, a cut-off applied to the tube for regulating the effective size of the discharge-openings, and scatterers for effecting a broadcast delivery of the material, substantially as set forth.

2. In combination, a hopper, a tube connected thereto and provided at intervals in its length with discharge-openings, a feeder for moving the material from the hopper through the tube, and scatterers secured to said tube, each consisting of a frame comprising a lower horizontal and vertical side bars, the latter being connected at their upper ends to opposite sides of the tube, the upper side of the horizontal bar being oppositely inclined, substantially as and for the purpose set forth.

3. In combination, a hopper, a tube projected approximately horizontally therefrom and provided at intervals in its length with discharge-openings, a feeder operating in the tube, a cut-off for regulating the size of the discharge-openings, and scatterers secured to the tube and provided with supports for sustaining the cut-off in working position, substantially as set forth.

4. In combination, a hopper, a tube projected laterally therefrom and provided at intervals in its length with discharge-openings, a feeder arranged within the tube, a cut-off for regulating the size of the discharge-openings, and scatterers for effecting a broadcast distribution of the material, each of said scatterers consisting of a frame comprising a lower horizontal bar and vertical side bars, the latter having their upper ends embracing opposite sides of the tube and secured thereto and having inwardly-extended lugs to support the cut-off, the lower horizontal bar having its upper side oppositely inclined, substantially as set forth.

5. In combination, a hopper, tubes connected to opposite sides of the hopper by means of a screw-thread joint and having discharge-openings at intervals in their length, handpieces secured to the tubes, and braces connecting the handpieces with the hopper, substantially as set forth.

6. In combination, a hopper having its lower portion provided with a central casing in which is formed an opening and having outward passages at each side of the central casing, tubes connected to opposite sides of the hopper, and provided at intervals in their length with discharge-openings, a shaft journaled in the side walls bordering upon the opening in the central part of the hopper, an operating element mounted upon said shaft and located in the opening of said central casing of the hopper, and feeders arranged in the tubes and connected at their inner ends with the said shaft, substantially as set forth.

In testimony whereof I affix my signature in presence of two witnesses.

RICHARD Y. KESSLER. [L. S.]

Witnesses:
   JOHN H. UNDERWOOD,
   H. E. FARNAM.